United States Patent
Shimojou et al.

(10) Patent No.: US 11,516,881 B2
(45) Date of Patent: Nov. 29, 2022

(54) SLICE MANAGEMENT SYSTEM AND SLICE MANAGEMENT METHOD

(71) Applicant: NTT DOCOMO, INC., Tokyo (JP)

(72) Inventors: Takuya Shimojou, Tokyo (JP); Shigeru Iwashina, Tokyo (JP); Masayoshi Shimizu, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 848 days.

(21) Appl. No.: 16/326,000

(22) PCT Filed: Aug. 17, 2017

(86) PCT No.: PCT/JP2017/029545
§ 371 (c)(1),
(2) Date: Feb. 15, 2019

(87) PCT Pub. No.: WO2018/034321
PCT Pub. Date: Feb. 22, 2018

(65) Prior Publication Data
US 2021/0360741 A1    Nov. 18, 2021

(30) Foreign Application Priority Data
Aug. 17, 2016    (JP) .............................. JP2016-159881

(51) Int. Cl.
*H04L 45/74* (2022.01)
*H04W 84/20* (2009.01)
*H04W 24/08* (2009.01)
*H04W 28/02* (2009.01)
*H04W 48/18* (2009.01)

(52) U.S. Cl.
CPC .......... *H04W 84/20* (2013.01); *H04W 24/08* (2013.01); *H04W 28/0247* (2013.01); *H04W 48/18* (2013.01)

(58) Field of Classification Search
None
See application file for complete search history.

(56) References Cited

U.S. PATENT DOCUMENTS

2015/0244643 A1\* 8/2015 Kinoshita ........... G06F 9/45558
 709/226
2019/0364492 A1\* 11/2019 Azizi .................... H04W 4/029

FOREIGN PATENT DOCUMENTS

JP         2015156168 A       8/2015

OTHER PUBLICATIONS

International Preliminary Report on Patentability from PCT/JP2017/029545 dated Feb. 21, 2019 (6 pages).

(Continued)

*Primary Examiner* — Willie J Daniel, Jr.
(74) *Attorney, Agent, or Firm* — Osha Bergman Watanabe & Burton LLP

(57) ABSTRACT

An object is to provide a slice management system capable of assigning slices to a plurality of business operators. In a parent SMF 100, a slice management table 103 can manage resources of a slice managed by a child SMF 100a or the like, and a communication unit 101 can notify the child SMF 100a or the like of the resources. The child SMF 100a or the like receives the resources and stores the resources in the slice management table 106. Therefore, the child SMF 100a or the like can manage the resources of the slice managed by the child SMF 100a or the like, and the child SMF 100a can independently enable the management of the resources.

5 Claims, 18 Drawing Sheets

(56) References Cited

OTHER PUBLICATIONS

Akihiro Nakao; "Virtual Node Project Virtualization for Building New-Generation"; National Institute of Information and Communication Technology; http://www.nict.go.jp/publication/NICT-News/1006/01.html, Jun. 2010, p. 1-p. 10 (12 pages).

Written Opinion of the International Searching Authority issued in PCT/JP2017/029545, dated Nov. 14, 2017 (6 pages).

* cited by examiner

Fig.4

SLICE MANAGEMENT TABLE

| SLICE ID | AVAILABLE NODE | MOBILITY CONTROL COMPATIBILITY | ACCESSIBLE AREA RANGE | SERVICE USE TIME | AVAILABLE BAND | MINIMUM DELAY TIME | MINIMUM PACKET LOSS RATE | RESOURCE USAGE RATE | MULTIPLE SERVICE RECEPTION FLAG |
|---|---|---|---|---|---|---|---|---|---|
| SLICE 1 | SERVER SV1, SWITCH SW1… | COMPATIBLE | KANTO | 24 HOUR AVAILABLE | 1G | 3s | 2% | 30% | 0 |

Fig.5

HARDWARE USAGE SITUATION TABLE

| HW NAME | SLICE IN USE | ASSIGNED RESOURCES | RESOURCE USAGE RATE | SURPLUS RESOURCES |
|---|---|---|---|---|
| SERVER 1 | SLICE 1<br>SLICE 2<br>SLICE 3 | 1Core, 500MB<br>1Core, 500MB<br>2Core, 1GB | 20%<br>20%<br>20% | 10Core,<br>10GB |
| SERVER 2 | SLICE 1<br>SLICE 2 | 1Core, 500MB<br>1Core, 500MB | 30%<br>10% | 4Core<br>5GB |
| SWITCH 1 | SLICE 1<br>SLICE 3 | 2Core, 1GB<br>1Core, 1GB | 20%<br>50% | 1Core<br>1GB |
| ... | | | | |

Fig.6

SLICE USAGE SITUATION TABLE

| SLICE NUMBER | ASSIGNED RESOURCES ||||
| | SERVER ID | SERVER RESOURCES | SWITCH ID | NETWORK RESOURCES | ... |
|---|---|---|---|---|---|
| SLICE 1-1 | SERVER 1 | CPU:1core<br>MEMORY:10GB<br>STORAGE:100GB | SW1 | BAND: 500MBPS<br>PRIORITY: HIGH | ... |
| SLICE 1-2 | SERVER 2 | CPU:1core<br>MEMORY:10GB<br>STORAGE:100GB | SW2 | BAND: 500MBPS<br>PRIORITY: MEDIUM | ... |
| SLICE 2-1 | SERVER 3 | CPU:1core<br>MEMORY:10GB<br>STORAGE:100GB | SW3 | BAND: 500MBPS<br>PRIORITY: MEDIUM | ... |
| ... | | | | | |

Fig.7

SERVICE MANAGEMENT TABLE

| SERVICE ID | MOBILITY CONTROL | ACCESS AREA RANGE | SERVICE USE TIME | ALLOWABLE LOWER LIMIT BAND | ALLOWABLE DELAY TIME | ALLOWABLE PACKET LOSS | FUNCTION | SEPARATION FLAG |
|---|---|---|---|---|---|---|---|---|
| SERVICES 1 | NECESSARY | TOKYO | 10:00~22:00 | 500M | 30s | 2% | USER AUTHENTICATION, MOVING IMAGE DISTRIBUTION | 0 |

Fig.8

SERVICE CORRESPONDENCE
SLICE MANAGEMENT TABLE

| SERVICE ID | SLICE ID |
|---|---|
| SERVICE 1 | Slice1 |

Fig.9

HARDWARE TABLE

| HW NAME | AMOUNT OF RESOURCES | AMOUNT OF POWER |
|---|---|---|
| SERVER 1 | 4Core, 2GB | ○○W |

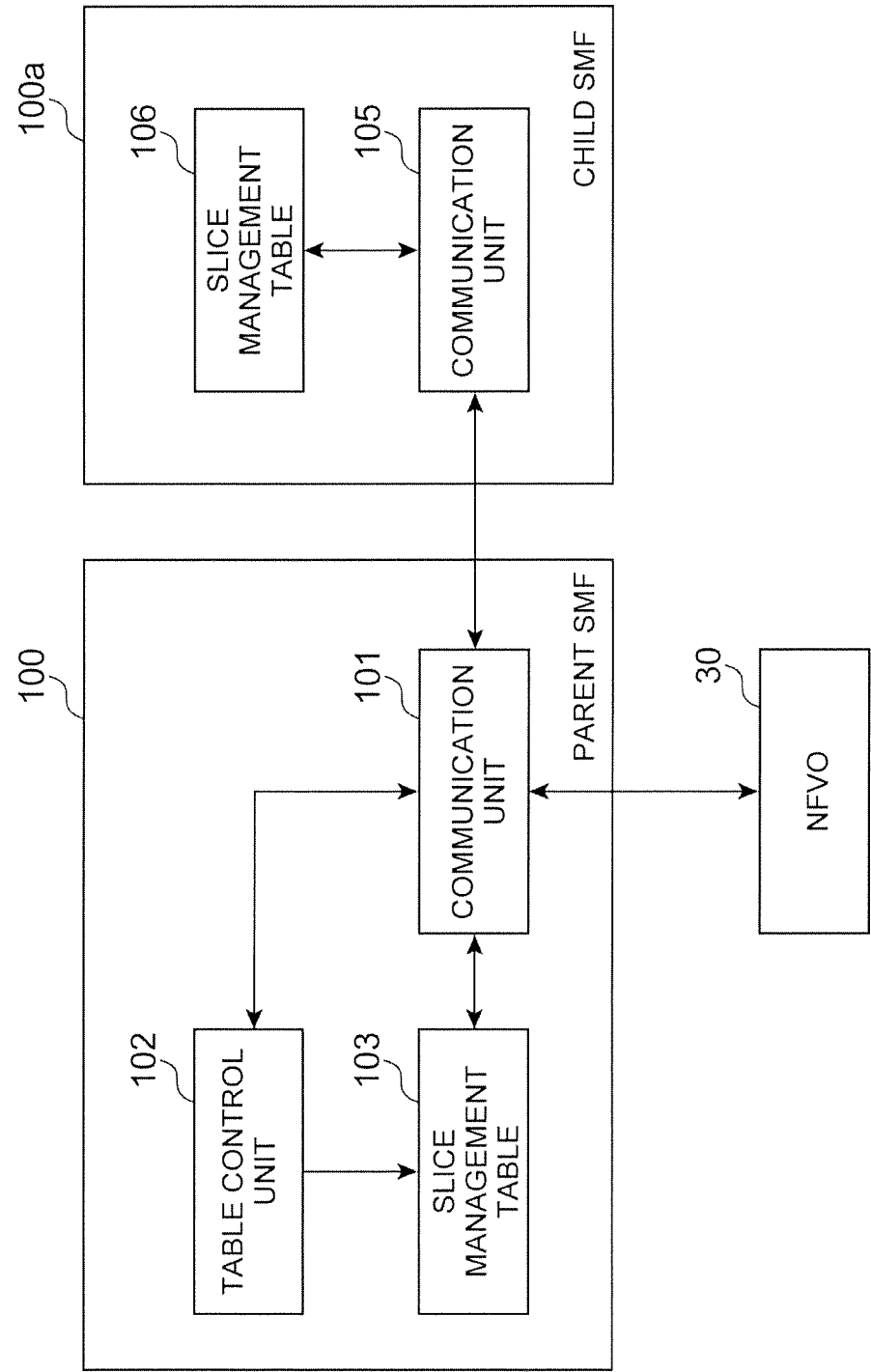

Fig. 11

(a) PARENT SMF

| ASSIGNMENT DESTINATION | SLICE NUMBER | ASSIGNED RESOURCES ||||| AFFILIATION SERVICE |
| --- | --- | --- | --- | --- | --- | --- |
| | | SERVER ID | SERVER RESOURCES | SWITCH ID | NETWORK RESOURCES | ... | |
| CHILD SMF1 | SLICE 1-1 | SERVER 1 | CPU: 1core MEMORY: 10GB STORAGE: 100GB | SW1 | BAND: 500MBPS PRIORITY: HIGH | ... | SERVICE 1 |
| CHILD SMF1 | SLICE 1-2 | SERVER 2 | CPU: 1core MEMORY: 10GB STORAGE: 100GB | SW2 | BAND: 500MBPS PRIORITY: MEDIUM | ... | SERVICE 2 |
| CHILD SMF2 | SLICE 2-1 | SERVER 3 | CPU: 1core MEMORY: 10GB STORAGE: 100GB | SW2 | BAND: 500MBPS PRIORITY: MEDIUM | ... | SERVICE 4 |
| ... | | | | | | | |

(b) CHILD SMF1

| SLICE NUMBER | ASSIGNED RESOURCES ||||| AFFILIATION SERVICE |
| --- | --- | --- | --- | --- | --- | --- |
| | SERVER ID | SERVER RESOURCES | SWITCH ID | NETWORK RESOURCES | ... | |
| SLICE 1-1 | SERVER 1 | CPU: 1core MEMORY: 10GB STORAGE: 100GB | SW1 | BAND: 500MBPS PRIORITY: HIGH | ... | SERVICE 1 |
| SLICE 1-2 | SERVER 2 | CPU: 1core MEMORY: 10GB STORAGE: 100GB | SW2 | BAND: 500MBPS PRIORITY: MEDIUM | ... | SERVICE 2 |

(c) CHILD SMF2

| SLICE NUMBER | ASSIGNED RESOURCE ||||| AFFILIATION SERVICE |
| --- | --- | --- | --- | --- | --- | --- |
| | SERVER ID | SERVER RESOURCE | SWITCH ID | NETWORK RESOURCE | ... | |
| SLICE 2-1 | SERVER 3 | CPU: 1core MEMORY: 10 GB STORAGE: 100 GB | SW3 | BAND: 500MBPS PRIORITY: MEDIUM | ... | SERVICE 4 |

Fig.15

(a) PARENT SMF

| ASSIGNMENT DESTINATION | SLICE NUMBER | ASSIGNED RESOURCES ||||| AFFILIATION SERVICE |
| --- | --- | --- | --- | --- | --- | --- | --- |
| | | SERVER ID | SERVER RESOURCES | SWITCH ID | NETWORK RESOURCES | ... | |
| CHILD SMF1 | SLICE 1-1 | SERVER 1 | CPU: 1core→2core MEMORY: 10GB STORAGE: 100GB | SW1 | BAND: 500MBPS PRIORITY: HIGH | ... | SERVICE 1 |
| CHILD SMF1 | SLICE 1-2 | SERVER 2 | CPU: 1core MEMORY: 10GB STORAGE: 100GB | SW2 | BAND: 500MBPS PRIORITY: MEDIUM | ... | SERVICE 2 |
| CHILD SMF2 | SLICE 2-1 | SERVER 3 | CPU: 1core MEMORY: 10GB STORAGE: 100GB | SW3 | BAND: 500MBPS PRIORITY: MEDIUM | ... | SERVICE 4 |
| ... | | | | | | | |

(b) CHILD SMF1

| SLICE NUMBER | ASSIGNED RESOURCES ||||| AFFILIATION SERVICE |
| --- | --- | --- | --- | --- | --- | --- |
| | SERVER ID | SERVER RESOURCES | SWITCH ID | NETWORK RESOURCES | ... | |
| SLICE 1-1 | SERVER 1 | CPU: 1core→2core MEMORY: 10GB STORAGE: 100GB | SW1 | BAND: 500MBPS PRIORITY: HIGH | ... | SERVICE 1 |
| SLICE 1-2 | SERVER 2 | CPU: 1core MEMORY: 10GB STORAGE: 100GB | SW2 | BAND: 500MBPS PRIORITY: MEDIUM | ... | SERVICE 2 |

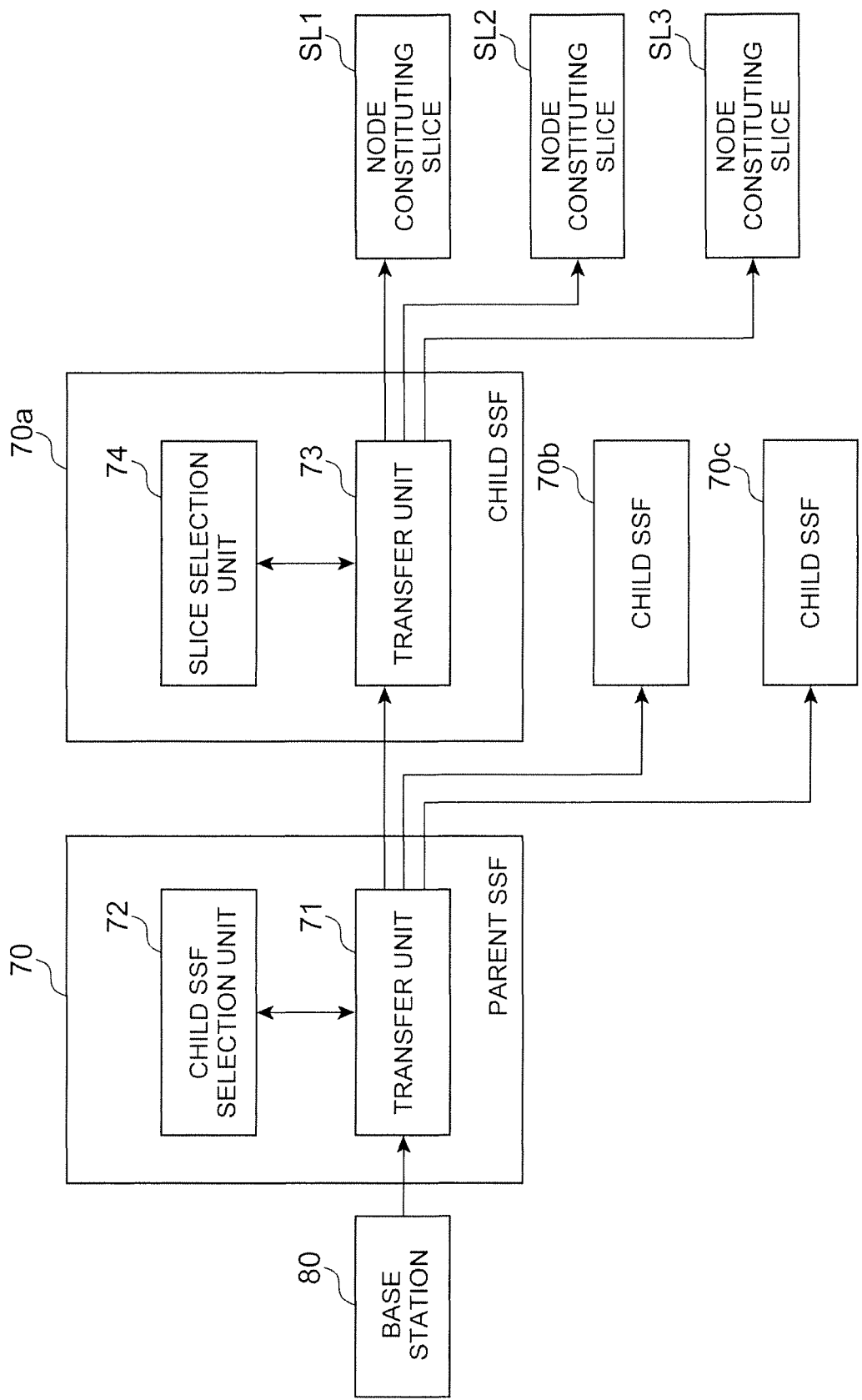

Fig.17

| User ID | SSF SELECTION PARAMETER | SLICE SELECTION PARAMETER 1 | SLICE SELECTION PARAMETER 2 | SLICE SELECTION PARAMETER 3 |
|---|---|---|---|---|
| AAA | SSF3 | UE usage type=X | DCN type=Y | service type=Z |
| HEADER PORTION | | SUB-HEADER PORTION | | |

SLICE MANAGEMENT SYSTEM AND SLICE MANAGEMENT METHOD

TECHNICAL FIELD

The present invention relates to a slice management system and a slice management method for managing slices that are virtualized networks.

BACKGROUND ART

A network system using a virtualization technology in the related art generates a slice that is a virtual network that is logically generated on a network infrastructure by virtually separating hardware resources using a virtualization technology disclosed in Non-Patent Document 1. A service can be provided using an independent network of the slice by assigning the service to the slice. Thus, when the slice is assigned to each service having various requirements, it is possible to easily satisfy the requirements of each service and to reduce signaling processing or the like.

CITATION LIST

Patent Literature

[Non-patent Literature 1] Akihiro Nakao, "Virtualization technology for New Generation Network of Virtualized Node and Project", [online], June 2010, National Institute of Information and Communications Technology, [Searched on Aug. 4, 2016], Internet <http://www.nict.go.jp/publication/NICT-News/1006/01.html>

SUMMARY OF INVENTION

Technical Problem

In the related art, it is assumed that a virtual network is constructed by one business operator. Therefore, the one business operator can decide slice assignment or the like.

However, cases in which one business operator desires to assign slices for a plurality of other business operators are also considered.

Therefore, an object of the present invention is to provide a slice management system and a slice management method capable of assigning slices to one or a plurality of business operators in order to solve the above problem.

Solution to Problem

In order to solve the above problem, a slice management system includes one or a plurality of child slice management devices that perform management of slices that are virtual networks generated on a network infrastructure, the one or plurality of child slice management devices being managed for one or a plurality of business operators, and a parent slice management device that manages the one or plurality of child slice management devices, wherein the parent slice management device includes: a parent management table that stores slice information indicating slices managed by the child slice management devices and resources assigned to the slice, in association with the child slice management devices; and a notification unit that notifies the child slice management devices of the slice information stored in the parent management table, and the child slice management devices include child management tables in which the slice information for constructing the slices is stored, the slice information being notified of by the notification unit.

According to the present invention, the parent slice management device can store the slice information indicating the slices managed by the child slice management devices and the resources assigned to the slices in association with the child slice management devices, and notify the child slice management devices of the slice information. Therefore, the parent slice management device makes it possible to assign slices to child slice management devices that are managed by one or a plurality of business operators.

Advantageous Effects of Invention

According to the present invention, it is possible to assign slices for one or a plurality of business operators.

BRIEF DESCRIPTION OF DRAWINGS

FIG. 4 is a diagram illustrating a slice management table.

FIG. 5 is a diagram illustrating a hardware usage situation table.

FIG. 6 is a diagram illustrating a slice usage situation table.

FIG. 7 is a diagram illustrating a service management table.

FIG. 8 is a diagram illustrating a service correspondence slice table.

FIG. 9 is a diagram illustrating a hardware table.

FIG. 10 is a hardware configuration diagram of a BSS/OSS or the like.

FIG. 11 is a sequence diagram according to an embodiment of the present invention.

FIG. 15 is a diagram illustrating state transition of content stored in a slice management table 103 and a slice management table 106.

FIG. 16 is a diagram illustrating a configuration of a system including a parent SSF 70 that performs slice selection.

FIG. 17 is a diagram illustrating a data structure.

FIG. 18 is a diagram illustrating an example of a hardware configuration of a parent SMF 100, a child SMF 100a, and the like.

DESCRIPTION OF EMBODIMENTS

Figure 1:
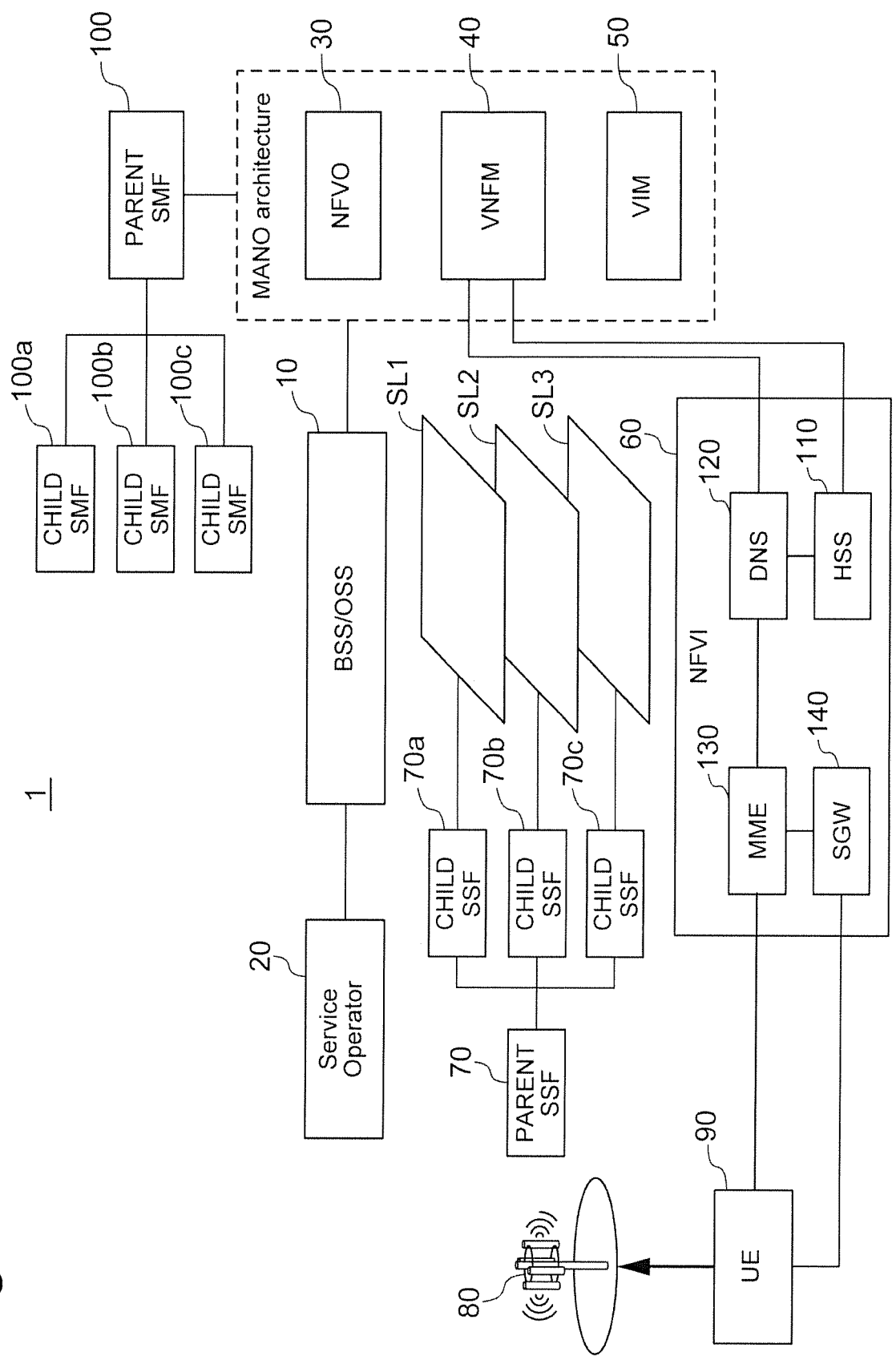
FIG. 1 illustrates a configuration of a system 1 (a slice management system) including a BSS/OSS 10 and an NFVO 30 according to an embodiment.

Embodiments of the present invention will be described with reference to the accompanying drawings. The same units are denoted by the same reference numerals, and redundant descriptions are omitted, if possible.

FIG. 1 illustrates a configuration of a system 1 (a slice management system) including a BSS/OSS 10 and an NFVO 30 according to the embodiment. The system 1 is a system that assigns services to slices that are virtual networks. A slice is a virtual network or a service network logically generated on a network infrastructure by virtually separating resources of a link and a node of a network device and combining the separated resources. The sources are separated between the slices, and the slices do not interfere with each other. The service is a service using network resources for a communication service (a dedicated line service or the like), an application service (moving image distribution, and a service using a sensor device such as an embedded device), or the like.

As illustrated in FIG. 1, a system 1 includes an operations support system/business support system (BSS/OSS) 10, a service operator (SO) 20, a network functions virtualization orchestrator (NFVO) 30, a virtualized network function manager (VNFM) 40, and a virtualized infrastructure management (VIM) 50. Further, the system 1 includes an NFV Infrastructure (NFVI) 60, a slice selection function (SSF) 70, a base station 80, and a user equipment (UE) 90. Among them, the NFVO 30, the VNFM 40, and the VIM 50 are a management and orchestration (MANO) architecture.

Further, in the embodiment, there are child SSFs 70a to 70c configured to be accessible to the SSF 70 (hereinafter referred to as a parent SSF 70). Further, the SMF 100 (hereinafter referred to as a parent SMF 100) is configured to be accessible to the MANO, and the child SMFs 100a to 100c are configured to be accessible to the parent SMF 100. The parent SMF 100 and the child SMFs 100a to 100c function as a parent slice management device and child slice management devices, respectively. Further, the NFVO 30 functions as a slice information storage device.

The parent SMF 100 and the child SMFs 100a to 100c cooperate with the parent SSF 70 and the child SSFs 70a to 70c, respectively. For example, the parent SMF 100 can perform management of distribution destinations including a distribution process in the parent SSF 70 as well. Further, the child SMFs 100a to 100c can perform management of the assignment destinations of the slices in the child SSFs 70a to 70c.

These components constitute a core network of the system 1. It should be noted that the components between which transmission and reception of information are necessary are connected to each other by a cable or the like such that information can be transmitted and received.

The system 1 according to the embodiment provides a communication function to a mobile communication terminal using a virtual server operating in a virtual machine implemented on a physical server. That is, the system 1 is a virtualized mobile communication network. The communication function is provided to the mobile communication terminal by executing a communication process according to the communication function using the virtual machine.

The NFVI 60 indicates a network formed of physical resources (a group of nodes) constituting a virtualization environment. These physical resources conceptually include calculation resources, storage resources, and transmission resources. Specifically, the physical resources include nodes such as a physical server which is a physical server device that performs a communication process in the system 1, and a switch. The physical server includes a CPU (a core or a processor), a memory, and a storage means such as a hard disk. Normally, a plurality of nodes such as physical servers constituting the NFVI 60 are collectively disposed at a base such as a data center (DC). In the data center, the disposed physical servers are connected to each other via a network inside the data center so that the physical servers can transmit and receive information. Further, the system 1 is provided with a plurality of data centers. The data centers are connected to each other via a network, and physical servers provided in different data centers can transmit and receive information to and from each other via the network.

The service operator (SO) 20 is a device that requests a service, and is, for example, a terminal device (for example, a personal computer) of a business operator that provides a service to various users using a virtual network.

The BSS/OSS 10 is a node that performs service management in the system 1 and gives instructions regarding communication functions in the system 1. For example, the BSS/OSS 10 instructs the NFVO 30 to add a new communication function (a communication service). Further, the BSS/OSS 10 can be manipulated by a communication carrier related to the system 1.

The NFVO 30 is an overall management node (functional entity) that manages the entire virtual network (slice) constructed on the NFVI 60 which is a physical resource. The NFVO 30 receives an instruction from the BSS/OSS 10 and performs a process according to the instruction. The NFVO 30 manages the entire virtualized network constructed in physical resources of the infrastructure and the mobile communication network of the communication service. The NFVO 30 realizes a communication service provided by the virtual network at an appropriate place via the VNFM 40 and the VIM 50. For example, life cycle management of the service (specifically, for example, generation, update, scale control, and event collection), distribution, reservation, and assignment management of the resources over the mobile communication network, service and instance management, and policy management (specifically, for example, reservation and assignment of the resources, and optimal disposition based on geography, laws and regulations, or the like) are performed.

The VNFM 40 is a virtual communication function management node (functional entity) that adds a function related to a service to the NFVI 60 serving as physical resources (a node). A plurality of VNFMs 40 may be provided in the system 1.

The VIM 50 is a physical resource management node (a functional entity) that manages each physical resource (node) in the NFVI 60. Specifically, the VIM 50 performs management of assignment, update, and collection of resources, association of the physical resources with a virtualization network, and management of a list of hardware resources and SW resources (hypervisor). Normally, the VIM 50 performs management for each data center (central office). The management of the physical resources is performed in a scheme according to the data center. Examples of types of schemes for managing the data center (a scheme of implementing the management resources) include OPENSTACK and vCenter. Normally, the VIM 50 is provided for each scheme for managing the data center. That is, a plurality of VIMs 50 that manage physical resources in the NFVI 60 using different schemes are included. It should be noted that units of the physical resources managed using different management schemes are not necessarily data center units.

It should be noted that the NFVO 30, the VNFM 40, and the VIM 50 are realized by a program being executed on a physical server device (however, the NFVO 30, the VNFM 40, and the VIM 50 are not limited to being realized on virtualization, but a management system may be separated and then the NFVO 30, the VNFM 40, and the VIM 50 may be realized on virtualization). The NFVO 30, the VNFM 40, and the VIM 50 may be realized by separate physical server devices or may be realized by the same server device. The NFVO 30, the VNFM 40, and the VIM 50 (a program for realizing the NFVO 30, the VNFM 40, and the VIM 50) may be provided by different vendors.

When the NFVO 30 receives a service assignment request from the BSS/OSS 10 or when the NFVO 30 receives a resource change request from the parent SMF 100, the NFVO 30 requests the VIM 50 to secure resources for slices (for example, slices SL1 and SL2). When the VIM 50 secures resources in a server device or a switch constituting the NFVI 60, the NFVO 30 defines a slice for the NFVI 60.

Further, when the NFVO 30 causes the VIM 50 to secure the resources in the NFVI 60, information defining the slice with respect to the NFVI 60 is stored in the slice management table stored in the NFVO 30. The NFVO 30 requests the VNFM 40 to install software for realizing a function required for a service. In response to the installation request, the VNFM 40 installs the software with respect to the NFVI 60 (a node such as a server device, a switch device, or a router device) secured by the VIM 50.

When the software is installed by the VNFM 40, the NFVO 30 associates the slice with the service in a service correspondence slice management table stored in the NFVO 30.

Figure 2:
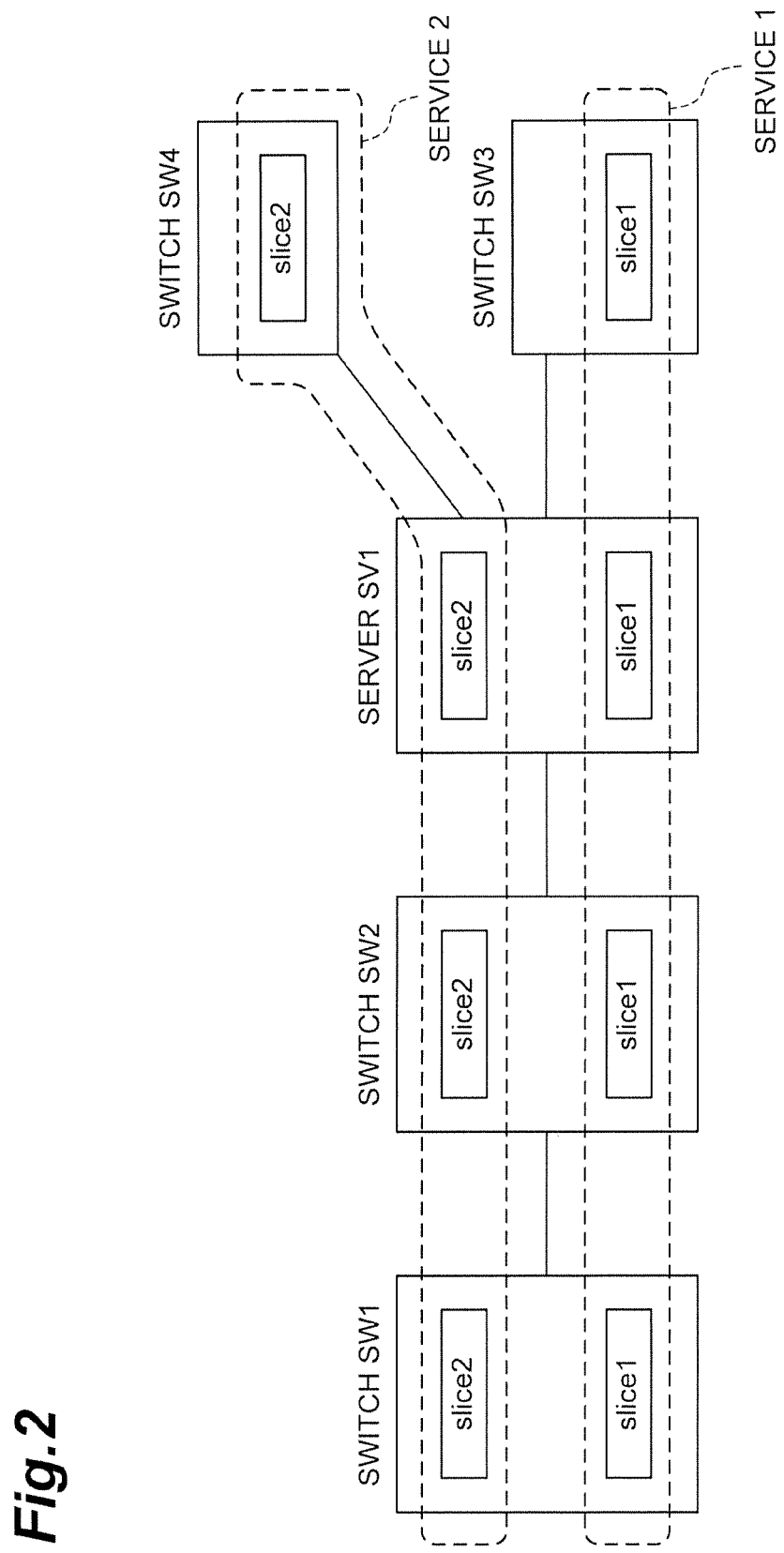
FIG. 2 is a diagram illustrating a correspondence relationship between slices and resources.

For example, as illustrated in FIG. 2, when the NFVO 30 sends a resource securing request for a slice (slice 1 and slice 2) to the VIM 50, the VIM 50 instructs the switch SW1, the switch SW2, the server SV1 and the switch SW3 to secure resources. The switch SW1, the switch SW2, the server SV1, and the switch SW3 secure resources for slice 1. Similarly, according to an instruction from the VIM 50, the switch SW1, the switch SW2, the server SV1, and the switch SW4 secure resources for slice 2.

Further, when resources are secured in each switch or the like by the VIM 50, the NFVO 30 assigns service 1 to slice 1 and assigns service 2 to slice 2. Thus, the NFVO 30 assigns services to independent slices. It should be noted that it is also possible to assign multiple services to each slice.

When the NFVO 30 assigns the service to the slice, the NFVO 30 transmits, to the BSS/OSS 10, access information including an ID of the service and a destination (for example, an IP address) of the hardware providing a first function of the service.

When the BSS/OSS 10 receives the access information, the BSS/OSS 10 notifies each parent SSF 70 of the access information. The parent SSF 70 is a server device capable of communicating with the base station 80. When a service request is sent from the UE 90 to the base station 80 together with the service ID, the base station 80 notifies the parent SSF 70 of the service ID received from the UE 90.

When the parent SSF 70 receives the service 11*l* from the base station 80, the parent SSF 70 transmits destination information of hardware that provides a first function of a service of the access information corresponding to the service ID received from the base station 80 in the access information stored in the parent SSF 70 to the base station 80. The base station 80 notifies the UE 90 of the destination information. Accordingly, the UE 90 can specify a destination that the UE 90 first accesses in order to use the service.

It should be noted that in FIG. 1, the child SSFs 70*a* to 70*c* are connected in parallel and these child SSFs 70*a* to 70*c* are connected in series with the parent SSF 70, but the present invention is not limited thereto. For example, there is no parent SSF 70, and the base station 80 such as an eNB may be connected to each of the child SSFs 70*a* to 70*c*. In this case, the base station 80 has a function of selecting any one of the child SSFs 70*a* to 70*c*. Further, the child SSFs 70*a* to 70*c* may be inside a call processing node such as an eNB or an MME or may exist independently as illustrated in FIG. 1.

In the following description, the parent SSF 70 and the child SSFs 70*a* to 70*c* are assumed to adopt a parent-child structure.

Figure 3:
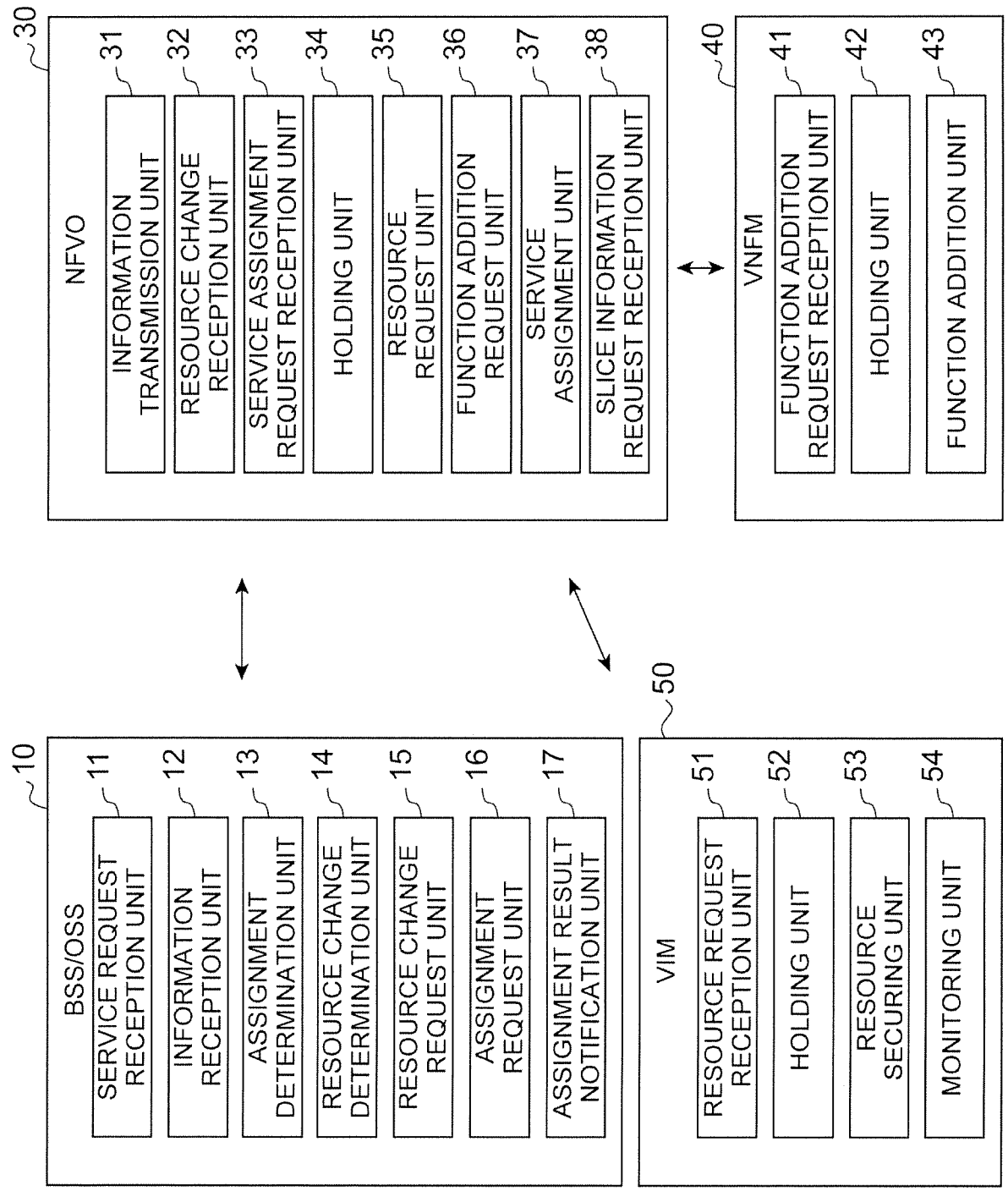
FIG. 3 is a block diagram of a device included in a system according to an embodiment of the present invention.

Next, functions according to the embodiment of the BSS/OSS 10, the NFVO 30, the VNFM 40, and the VIM 50 will be described with reference to FIG. 3. As illustrated in FIG. 3, the BSS/OSS 10 includes a service request reception unit 11, an information reception unit 12, an assignment determination unit 13, a resource change determination unit 14 (a resource changing means), a resource change request unit 15, an assignment request unit 16, and an assignment result notification unit 17.

The service request reception unit 11 is a unit that receives a service request including service requirements that are requirements of a function or performance in a service from the SO. Here, among the service requirements, the function requirements are requirements regarding a function for executing the service. Specifically, necessity of mobility control, a range of an accessible area, and a service use time are included as the function requirements. The necessity of mobility control indicates whether or not handover control is necessary. The access area range indicates a range (area) in which a service is provided. The service use time indicates a time period in which the service is used.

The performance requirements are requirements regarding the performance of the slice for executing the service. Specifically, the performance requirements include a permitted lower limit band, an allowable delay time, a minimum packet loss rate, and the like. Here, the permitted lower limit band indicates a lower limit value of a frequency band that is used for communication, the permitted delay time indicates a time for which communication delay is permitted, and the permitted packet loss rate is a permissible packet loss rate.

Further, when the service request reception unit 11 receives a service request, the service request reception unit 11 receives information indicating a function for realizing the service. Here, the information indicating the function for realizing the service includes information for specifying the function (for example, function identification information and a function name). Further, the service request reception unit 11 may receive software for realizing the function from the SO 20.

When the service request reception unit 11 receives the service requirements and the information indicating the function for realizing the service, the service request reception unit 11 transmits the service requirements to the assignment determination unit 13 and transmits the information indicating the function for realizing the service (function information) to the assignment request unit 16. Further, the service request reception unit 11 notifies the information reception unit 12 that the service request has been received at this timing. Here, the function information includes information for identifying the function, and software for realizing the function.

The information reception unit 12 is a unit that receives information on slices from the NFVO 30 and acquires information on the usage situation of the resources that are assigned to the generated slices. Specifically, when the information reception unit 12 receives an indication indicating the reception of the service request from the service request reception unit 11, the information reception unit 12 requests the NFVO 30 to transmit slice attribute information, hardware usage situation information, and slice usage situation information.

It should be noted that the NFVO 30 stores information on a slice management table including the slice attribute information, a hardware usage situation table including the hardware usage situation information, and a slice usage situation table including the slice usage situation information. When the NFVO 30 receives the information transmission request from the information reception unit 12, the NFVO 30 transmits the information on the slice management table, the information on the hardware usage situation table, and the information on the slice usage situation table to the BSS/OSS 10.

Here, FIG. 4 illustrates an example of the slice management table stored in the NFVO 30. The slice management table includes a slice ID, an available node, mobility control compatibility, an accessible area range, a service use time, an available band, a minimum delay time, a minimum packet loss rate, a resource usage rate, and a multiple service reception flag.

The slice ID is an ID for unique identification which is determined when a record is newly added to the slice management table by the NFVO 30. An available node indicates a node secured by the VIM 50 (a node constituting the NFVI 60) as a result of requesting the VIM 50 to secure the resources. Examples of information defined by the available node include information for identifying a node (a hardware name or the like), and the amount of assigned resources (a capacity of an occupied memory, an occupancy rate of a CPU, or the like) in each node. The mobility control compatibility is information indicating whether or not the available node is compatible with mobility control. The accessible area range is information indicating an accessible area based on a position of the available node. The service use time is information indicating a service available time based on the available node. The available band is information indicating a maximum band that can be provided in the available node.

The minimum delay time indicates a minimum delay time based on the available node. The minimum packet loss rate indicates a minimum packet loss rate based on available resources. The resource usage rate indicates a usage rate of the resources assigned in a current node. The multiple service reception flag is a value indicating whether or not a service designated to be isolated from another service is assigned. When the service designated to be isolated from the other service is assigned, information indicating this (for example, "1") is set.

Next, an example of the hardware usage situation table is illustrated in FIG. 5. The hardware usage situation table includes a HW name, a slice in use, assigned resources, a resource usage rate, and surplus resources. The HW name is a hardware name that can uniquely identify a server device or a switch. The slice in use is information on the slice (for example, a slice ID) to which the device is assigned. The assigned resources are the amount of resources assigned to each slice and are resources that are used for an existing slice. The resource usage rate is a usage rate of resources in each slice. The surplus resources are resources that are not assigned to the slice, and correspond to an unassigned CPU core, a clock frequency, an unassigned memory area, an unassigned storage capacity, and an unassigned queue.

Next, an example of the slice usage situation table is illustrated in FIG. 6. The slice usage situation table includes a slice ID, an ID of hardware (a server and a switch), and resources. The slice ID is an ID of each slice. The hardware ID is an ID assigned to each piece of hardware. The resources are the amount of resources assigned to each slice, and are, for example, the number of CPU operations, the amount of used memory, the amount of used storage, and an available band of a network in a switch or the like.

It should be noted that a memory usage rate, a CPU usage rate, a storage usage rate, and a band usage rate, and the like may also be included in the slice usage situation table. In this case, the memory usage rate is a usage rate regarding the memory of each assigned piece of hardware. Specifically, the memory usage rate is a ratio of a memory area used in the slice to an assigned memory area. The CPU usage rate is a usage rate regarding a CPU of each assigned piece of hardware. Specifically, the CPU usage rate is a ratio of a CPU core and a clock frequency used for the slice to a CPU core and a clock frequency that have been assigned. The storage usage rate is a usage rate regarding a storage of each assigned piece of hardware. Specifically, the storage usage rate is a ratio of a storage area used for the slice to an assigned storage area. The band usage rate is a usage rate regarding a band of each assigned piece of hardware. Specifically, the band usage rate is a bit rate used by the slice to a maximum outputtable bit rate of a queue or a virtual MC that has been assigned. Here, the band usage rate in the server indicates a band usage rate of the virtual NEC.

When the information reception unit 12 receives the information included in the slice management table from the NFVO 30, the information reception unit 12 transmits the information to the assignment determination unit 13. The assignment determination unit 13 determines whether the requested service is to be assigned to an existing slice or a new slice using this information. When the information reception unit 12 receives the slice usage situation information and the hardware usage situation information, the information reception unit 12 transmits the information to the resource change determination unit 14. The resource change determination unit 14 determines whether a new slice can be created or an existing slice can be extended using the hardware usage situation information. When there are no resources to newly create a changed slice or extend an existing slice, the resource change determination unit 14 determines a slice to reduce the slice usage situation information and the hardware use state information.

The assignment determination unit 13 is a unit that determines which of the existing slice and the new slice a service is assigned on the basis of service requirements of the service received by the service request reception unit 11 and an attribute of the existing slice. When the assignment determination unit 13 receives the service requirements from the service request reception unit 11 and receives the slice usage situation information from the information reception unit 12, the assignment determination unit 13 determines which of the existing slice and the new slice the service is assigned using the service requirements and the slice usage situation information.

First, when the requirements (isolation requirements) that mean isolation from other services are included as the service requirements, the assignment determination unit 13 determines that the service is assigned to the new slice. When the requirements that mean isolation from other services are not included as the service requirements, the assignment determination unit 13 determines whether there is attribute information of an existing slice that satisfies the service requirements.

When there is the attribute information of the existing slice that satisfies the service requirements, the assignment determination unit 13 determines that a requested service is assigned to (accommodated in) the existing slice and transmits the determined content to the assignment request unit 16.

Further, even when the function and performance requirements are satisfied, the assignment determination unit 13 can determine that the service cannot be added to a current slice on the basis of the usage rate of the available node in some cases. In this case, the assignment determination unit 13 determines that the existing slice is extended or a new slice is added. In the case, the assignment determination unit 13 notifies the resource change determination unit 14 of this, and receives a result of a determination as to whether the existing slice can be extended or the new slice can be added from the resource change determination unit 14.

For example, when there is a slice that satisfies function and performance requirements other than the usage rate of the available node, the assignment determination unit 13 determines that a service is assigned to the slice and notifies the resource change determination unit 14 of the amount of resources necessary for extension (for example, the amount of resources to be reduced) and the slice that is an extension target.

When there is no slice that satisfies the function and performance requirements other than the usage rate of the available node, the assignment determination unit 13 generates a new slice, determines that a service is assigned to the slice, and notifies the resource change determination unit 14 of the generation of the new slice and the amount of resources necessary for the service.

The assignment determination unit 13 determines that the existing slice is extended or the new slice is added, and transmits content indicating that the existing slice is extended or the new slice is added to the assignment request unit 16 when the assignment determination unit 13 receives a notification indicating that the existing slice can be extended or the new slice can be added from the resource change determination unit 14.

When the assignment determination unit 13 determines whether a slice is newly created and a service is assigned to the slice, a service is assigned to the existing slice, or the existing slice is extended and a service is assigned to the existing slice, the assignment determination unit 13 transmits the determined content to the assignment request unit 16.

When the assignment determination unit 13 has determined that a slice is newly created and a service is assigned to the slice, the assignment determination unit 13 transmits an indication indicating that a new slice is created and service requirements as determined content to the assignment request unit 16.

When the assignment determination unit 13 has determined that the service is assigned to the existing slice, the assignment determination unit 13 transmits an indication indicating that the service is assigned to the existing slice, an existing slice ID, and service requirements as the determined content to the assignment request unit 16.

When the assignment determination unit 13 has determined that the existing slice is extended and the service is assigned, the assignment determination unit 13 transmits an indication indicating that the existing slice is extended and the service is assigned to the existing slice, an existing slice ID, the amount of resources to be extended, and service requirements as the determined content to the assignment request unit 16.

When the assignment determination unit 13 has determined that the existing slice is extended and the service is assigned, the assignment determination unit 13 transmits an indication indicating that the existing slice is extended and the service is assigned to the existing slice, an existing slice ID, the amount of resources to be extended, and service requirements as the determined content to the assignment request unit 16.

The resource change determination unit 14 is a unit that determines whether a new slice can be generated or the existing slice can be extended. Further, the resource change determination unit 14 is a unit that performs a determination process of determining a slice of which the assigned amount of resources is reduced when it is revealed that resources are insufficient as a result of trying to newly create the slice or extend the existing slice on the basis of information on the resource usage situation. That is, the resource change determination unit 14 specifies a slice based on the information on the resource usage situation (for example, the resource usage rate) according to prediction information of the resource usage situation due to the generation of the new slice or the extension of the existing slice. Here, the prediction information of the resource usage situation is information based on a change in the resource usage situation, and corresponds to, for example, the amount of resources necessary for the generation of the new slice or the extension of the existing slice, and a difference value between the amount of resources necessary for the generation of the new slice or the extension of the existing slice and the surplus resources.

The resource change determination unit 14 receives the slice usage situation information and the hardware usage situation information from the information reception unit 12 and determines whether or not there is a need to change the resources by using these pieces of information or specifies a slice that is a resource change target.

When the resource change determination unit 14 receives an indication indicating that the new slice is to be generated and the amount of resources necessary for a service from the assignment determination unit 13, the resource change determination unit 14 determines whether or not there is the amount of resources necessary for a service by referring to the surplus resources of the hardware usage situation information, and notifies the assignment determination unit 13 that the new slice can be generated when there is the amount of resources necessary for a service.

On the other hand, when the resource change determination unit 14 determines that there is no amount of resources necessary for a service, the resource change determination unit 14 determines a slice in which at least one of the memory usage rate, the CPU usage rate, the storage usage rate, and the band usage rate is lower than a previously stored threshold value (for example, the usage rate is smaller than 20%), to be a slice that is a reduction target by referring to the slice usage situation table. It should be noted that the resource change determination unit 14 may compare a highest usage rate among the plurality of types of usage rates with the threshold value to determine the slice that is a reduction target or may compare an average value of all of the plurality of types of usage rates with the threshold value to determine the slice that is a reduction target. The resource change determination unit 14 notifies the resource change request unit 15 of the slice that is a reduction target and the amount of resources to be reduced. When the resource change determination unit 14 receives an indication indicating the resource change completion from the resource change request unit 15, the resource change determination unit 14 notifies the assignment determination unit 13 that a new slice can be generated.

When the resource change determination unit 14 receives an indication indicating that an existing slice is to be extended and the amount of resources necessary for extension from the assignment determination unit 13, the resource change determination unit 14 determines whether or not the slice can be extended by referring to the surplus resources of the hardware usage situation information of the existing slice that is an extension target, and notifies the assignment determination unit 13 that the slice can be extended when the slice can be extended.

On the other hand, when there are no surplus resources for extension in the existing slice that is an extension target, the resource change determination unit 14 refers to the slice usage situation table and determines the existing slice that is an extension target to be the slice that is a reduction target when there is hardware in which at least one of the memory usage rate, the CPU usage rate, the storage usage rate, and the band usage rate in the hardware assigned to the existing slice that is an extension target is low (for example, the usage rate is smaller than 20%). The resource change determination unit 14 notifies the resource change request unit 15 of the slice that is a reduction target and the amount of resources to be reduced. When resource change determination unit 14 receives an indication indicating resource change completion from the resource change request unit 15, the resource change determination unit 14 notifies the assignment determination unit 13 that the slice can be extended.

The resource change request unit 15 is a unit that sends a resource change request to the NFVO 30 on the basis of the notification from the resource change determination unit 14. When the resource change request unit 15 receives the slice that is a reduction target and the amount of resources to be reduced from the resource change determination unit 14, the resource change request unit 15 notifies the NFVO of the slice that is a reduction target and the amount of resources to be reduced and makes a resource change request. When the NFVO 30 changes the resources in response to the resource change request, the NFVO 30 notifies the BSS/OSS 10 of the resource change completion. The resource change request unit 15 receives the notification of the resource change completion and notifies the resource change determination unit 14 of the resource change completion.

The assignment request unit 16 is a unit that makes a request to assign a service to the slice determined by the assignment determination unit 13. Specifically, the assignment request unit 16 transmits the content determined by the assignment determination unit 13 from the assignment determination unit 13 to the NFVO 30 and makes a service assignment request. Accordingly, in the NFVO 30, service is assigned to the slice.

The assignment result notification unit 17 is a unit that receives an assignment result from the NFVO 30. Specifically, the assignment result notification unit 17 receives the assignment result (a result indicating whether the assignment has been completed or is impossible) from the NFVO 30. The information indicating the assignment completion includes a service ID and an address of the access destination. When the assignment result indicates the assignment completion, the assignment result notification unit 17 transmits the service ID and the access destination to the parent SSF 70.

The NFVO 30 includes an information transmission unit 31, a resource change reception unit 32, a service assignment request reception unit 33, a holding unit 34 (a resource usage situation information storage means), a resource request unit 35 (a resource changing means), a function addition request unit 36, and a service assignment unit 37. When the information transmission unit 31 receives the information transmission request from the BSS/OSS 10, the information transmission unit 31 transmits the information on the slice management table, the information on the slice usage situation table, and the information on the hardware usage situation table stored in the holding unit 34 to the BSS/OSS 10.

The resource change reception unit 32 is a unit that receives the slice that is a reduction target and the amount of resources to be reduced from the BSS/OSS 10 and also receives the resource change request. When the resource change reception unit 32 receives the resource change request, the resource change reception unit 32 notifies the resource request unit 35 of the slice that is a reduction target and the amount of resources to be reduced, and changes the resources. When the resource change reception unit 32 receives the notification indicating that the resource has been changed from the resource request unit 35, the resource change reception unit 32 notifies the BSS/OSS 10 that the resource has been changed.

Further, the resource change reception unit 32 receives the resource change request from the parent SMF 100. The change request includes a slice ID indicating a slice that is a change target, and content of change of the resources. When the resource change reception unit 32 receives the change request, the resource change reception unit 32 notifies the resource request unit 35 of the reception and performs a resource changing process.

The service assignment request reception unit 33 is a unit that receives the content determined by the assignment determination unit 13 from the BSS/OSS 10 and also receives the service assignment request. When "the indication indicating that the existing slice is extended and the service is assigned to the existing slice" or "the indication indicating that the new slice is created" is included in the content determined by the assignment determination unit 13, the service assignment request reception unit 33 transmits information regarding the resources to the resource request unit 35.

Further, when the service assignment request reception unit 33 receives an indication indicating securing of resources from the resource request unit 35, the service assignment request reception unit 33 transmits the indication to the BSS/OSS 10. Further, the service assignment request reception unit 33 receives function information at a predetermined timing. When service assignment request reception unit 33 receives the function information, the service assignment request reception unit 33 transmits the function information to the function addition request unit 36.

After the service assignment unit 37 has performed the service assignment, the service assignment request reception unit 33 receives an assignment result from the service assignment unit 37 and transmits the assignment result to the BSS/OSS 10.

The holding unit 34 is a unit that stores various tables. The holding unit 34 stores the slice management table, the slice usage situation table, the hardware usage situation table, the service management table, and the service correspondence slice management table. FIG. 7 illustrates the service management table. This service management table is information based on the service requirements received from the BSS/OSS 10 by the service assignment request reception unit 33. The service management table includes a service ID, a mobility control, an access area range, a service use time, a permitted lower limit band, an allowable delay time, an allowable packet loss, a function, and a separation flag. The service assignment unit 37 registers information in which the service ID is added to the service requirement in the service management table.

Next, FIG. 8 illustrates a service correspondence slice management table. This service correspondence slice management table includes a service ID and a slice ID. The service assignment unit 37 registers the service ID when information is added to the service management table, and a slice ID of an assignment destination in the service correspondence slice management table.

The resource request unit 35 is a unit that requests the VIM 50 to secure resources. The resource request unit 35 requests the VIM 50 to secure resource of the amount of resources received from the service assignment request reception unit 33. When the resource request unit 35 receives a resource securing completion notification from the VIM 50, the resource request unit 35 sends a notification to the service assignment request reception unit 33. Further, the resource request unit 35 requests the VIM 50 to secure resources of the content of the change (increased amount of resources) transmitted from the parent SMF 100.

The function addition request unit 36 is a unit that requests the VNFM 40 to add a function. The function addition request unit 36 requests the VIM 50 to secure resources of the amount of resources received from the service assignment request reception unit 33. When the function addition request unit 36 receives a function addition completion notification from the VNFM 40, the function addition request unit 36 notifies the service assignment unit 37 of the function addition completion notification.

The service assignment unit 37 is a unit that assigns a service. When the service assignment unit 37 receives the function addition completion notification using the function addition request unit 36, the service assignment unit 37 registers information based on the service requirements in the service management table, and registers the service ID and the slice ID in the service correspondence slice management table.

A slice usage situation information request reception unit 38 receives a request for the slice usage situation information from the parent SMF 100 and transmits the slice usage situation information in a slice usage situation information table to the parent SMF 100 via the information transmission unit 31.

Next, the VNFM 40 will be described. The VNFM 40 includes a function addition request reception unit 41, a holding unit 42, and a function addition unit 43. The function addition request reception unit 41 is a unit that receives a function addition request from the NFVO 30. The function addition request reception unit 41 notifies the function addition unit 43 that the function addition request has been received. Further, when the function addition request reception unit 41 receives software related to an added function from the NFVO 30, the function addition request reception unit 41 also transmits the software to the function addition unit 43.

When the function addition request reception unit 41 receives the function addition completion notification after the function addition unit 43 adds the function, the function addition request reception unit 41 notifies the NFVO 30 of the function addition completion.

The holding unit 42 is a unit (for example, a repository) that holds software. The holding unit 42 holds software highly likely to be commonly used for communication.

The function addition unit 43 is a unit that installs a function. When the function addition unit 43 receives the function addition request from the function addition request reception unit 41, the function addition unit 43 installs a function to the available node that is a target. When the function addition unit 43 installs the function, the function addition unit 43 installs the software held by the holding unit 42 in the available node in a case in which a function that is a request target is a function of the software held in the holding unit 42. Further, when the function addition unit 43 receives software that is an installation target from the function addition request reception unit 41, the function addition unit 43 installs the software. The function addition unit 43 notifies the NFVO 30 of an installation completion after the installation is completed.

The VIM 50 includes a resource request reception unit 51, a holding unit 52, a resource securing unit 53, and a monitoring unit 54. The resource request reception unit 51 is a unit that receives a resource securing request from the NFVO 30. When the resource request reception unit 51 receives a resource request, the resource request reception unit 51 sends a notification to the resource securing unit 53. The holding unit 52 is a unit that holds information on resources. The holding unit 52 holds information on a hardware table.

When the VIM 50 receives a request for transmission of the hardware information together with the identification information of the available node from the BSS/OSS 10, the VIM 50 acquires the hardware information corresponding to the identification information of the available node from the hardware table.

Here, the hardware table stored in the VIM 50 is illustrated in FIG. 9. The hardware table is a table for managing hardware information including a HW name, an amount of resources, and the amount of power.

The HW name is identification information of hardware. The amount of resources indicates the amount of resources of the hardware, such as a memory capacity and capability (the number, an execution speed, or the like) of a CPU. The amount of power is the amount of power when the entire hardware is used.

When the VIM 50 acquires the hardware information corresponding to the identification information of the available node from the hardware table, the VIM 50 transmits the hardware information to the BSS/OSS 10.

The resource securing unit 53 is a unit that secures resources. When notification of the resource request is received by the resource request reception unit 51, the resource securing unit 53 assigns the slice on the basis of the surplus resources. After the resource securing unit 53 secures the resources, the resource securing unit 53 sends a notification to the resource request reception unit 51. The monitoring unit 54 is a unit that monitors the usage situation of the NFVI 60. The monitoring unit 54 reflects a monitoring result in the resource usage rate.

Next, functional configurations of the parent SMF 100 and the child SMFs 100a to 100c will be described. FIG. 10 is a block diagram illustrating functions of the parent SMF 100 and the child SMFs 100a to 100c. The parent SMF 100 includes a communication unit 101, a table control unit 102, and a slice management table 103.

The communication unit 101 is a unit that communicates with the child SMF 100a, or the like, and is a unit that receives a request for change of slice resources or receives a new assignment request. The communication unit 101 is a unit that notifies the child SMF 100a or the like of the slice usage situation information acquired from the NFVO 30.

When the slice usage situation information acquired by the communication unit 101 is stored in the slice management table 103, or a slice assignment request comes from the child SMFs 100a to 100c, the table control unit 102 determines whether or not there is an unassigned slice by referring to the slice management table 103, and performs storage in association with the identification information of the child SMFs 100a to 100c, as necessary.

The slice management table 103 is a unit that stores the slice usage situation information acquired from the NFVO 30 in association with the child SMF 100*a* or the like. FIG. 11(*a*) is a diagram illustrating a specific example thereof. As illustrated in FIG. 11(*a*), the slice management table 103 stores identification information of the child SMF that is an assignment destination, assigned resources (server resources and network resources), a slice under management, and an affiliation service in association with each other.

For example, in the ID of the child SMF 100*a*: child SMF 1, CPU: 1 Core, memory: 1 GB, and storage: 100 GB are assigned to the ID of the server that is a virtualization server: server 1. Further, as network resources, a band: 500 Mbps and a priority: "high" are set for the switch ID: SW1.

The child SMF 100*a* includes a communication unit 105 and a slice management table 106.

The communication unit 105 is a unit that communicates with the parent SMF 100, and transmits a slice assignment request or transmits a resource change request. Further, the communication unit 105 receives slice usage situation information that is transmitted from the parent SMF 100.

Here, identification information of the child SMF 100*a* and a resource usage policy that is an assignment request target are included in the slice assignment request. The resource usage policy indicates the number of CPUs in the virtualization server, a capacity of the memory, a capacity of the storage, a band and priority of the network, and includes one of these.

The slice management table 106 is a unit that stores the slice usage situation information received by the communication unit 105.

Specific examples are illustrated in FIGS. 11(*b*) and (*c*). FIG. 11(*b*) illustrates information that is described in the slice management table 106 of the child SMF 100*a* which is ID: child SMF 1. FIG. 11(*c*) illustrates information that is described in the management table of the child SMF 100*b* which is ID: child SMF 2. As illustrated in FIGS. 11(*b*) and (*c*), the slice management table 106 stores a slice that is an assignment destination, an assigned resource, and an affiliation service in association with each other.

Figure 12:
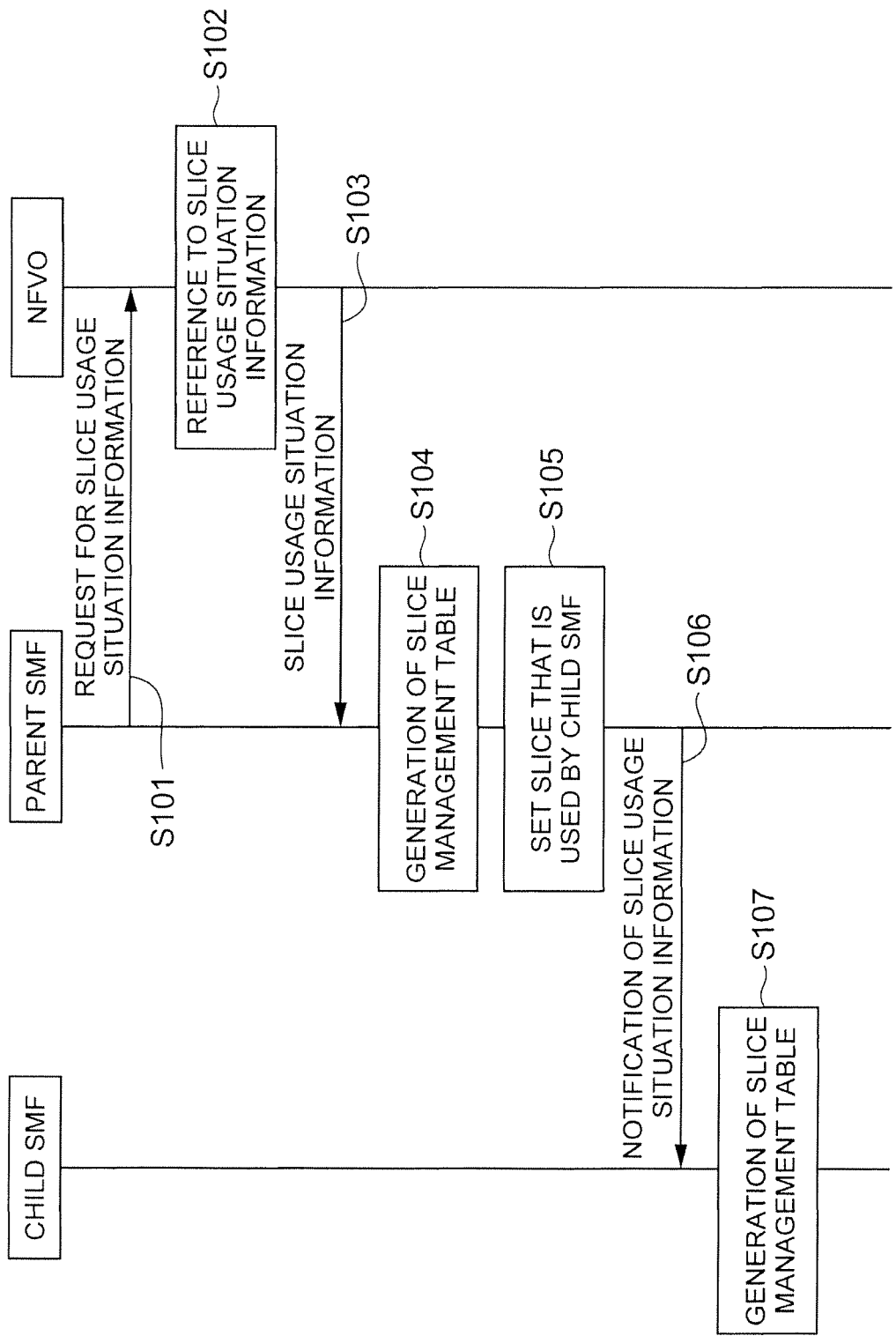
FIG. 12 is a sequence diagram of a resource assignment request process and a resource changing process.

Next, a resource assignment request process using the parent SMF 100 and the child SMFs 100*a* to 100*c* in the system 1 configured in this way, and a resource changing process will be described. FIG. 12 is a diagram illustrating a processing sequence thereof.

First, in the parent SMF 100, a request for slice usage situation information is sent to the NFVO 30. This is performed on the basis of a manipulation of an operator of the parent SMF 100 (S101).

In the NFVO 30, when the slice usage situation information request is received by the slice usage situation information request reception unit 38, the slice usage situation information described in the slice usage situation table of the holding unit 34 is referred to and acquired (S102). The slice usage situation information is transmitted to the parent SMF 100 by the information transmission unit 31 (S103).

When the slice usage situation information is received in the parent SMF 100, the slice usage situation information is stored in the slice management table 103 (S104). It should be noted that in this case, the assignment destination illustrated in FIG. 11(*a*) is not determined, and only a slice number, assigned resources, and the like are stored.

The child SMFs 100*a* to 100*c* are set as assignment destinations in association with the slice usage situation information according to a manipulation of the operator and are stored in the slice management table 103 (see S105, FIG. 11(*a*)). The set slice usage situation information is transmitted to each of the associated child SMFs 100*a* to 100*c* (S106).

In the child SMFs 100*a* to 100*c*, the transmitted slice usage situation information is stored in the slice management table 106 (S107; see FIGS. 11(*b*) and (*c*)). In the child SMFs 100*a* to 100*c*, the operator can perform a determination as to change of the virtual resources, or the like by referring to the slice usage situation information described in the slice management table 106.

Figure 13:
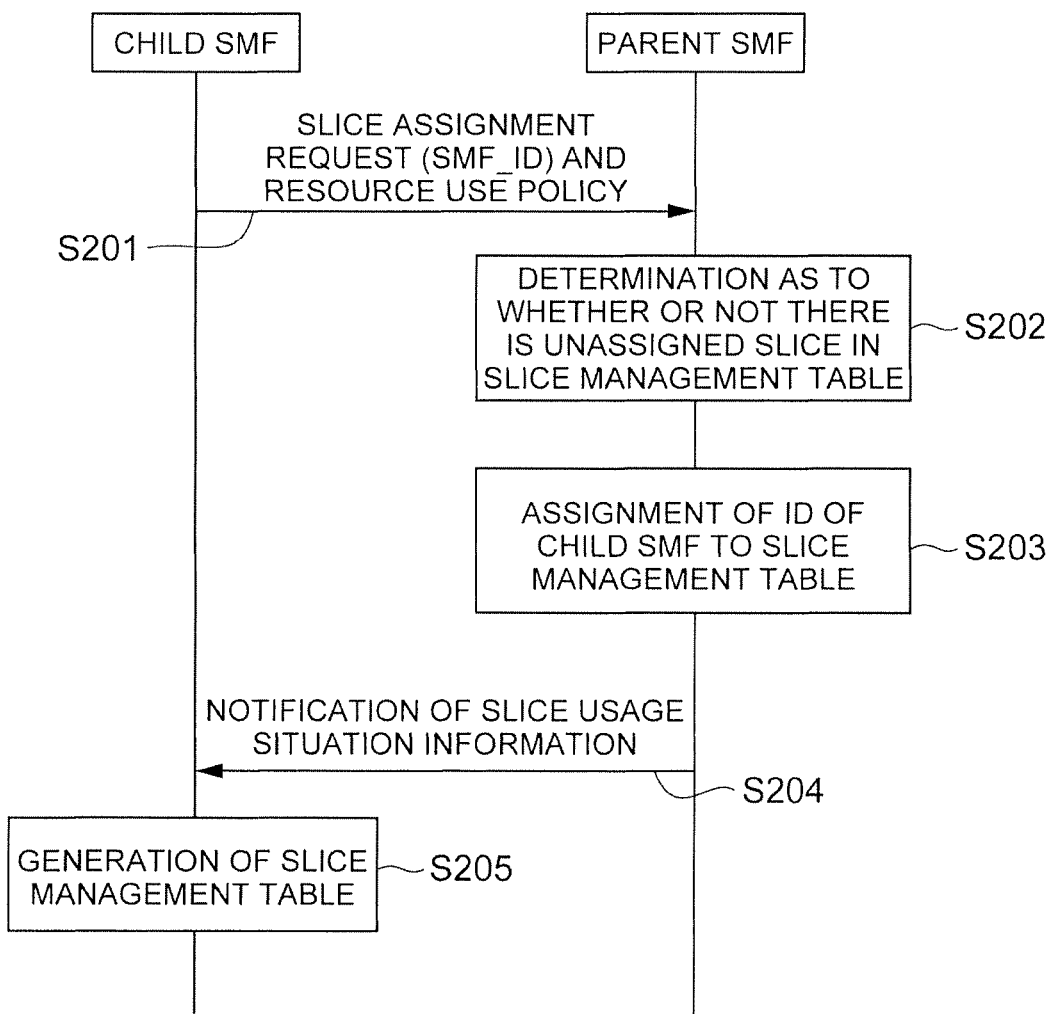
FIG. 13 is a sequence diagram of a process when a slice assignment request is performed.

Next, a process when the slice assignment request is performed in the child SMFs 100*a* to 100*c* will be described. FIG. 13 is a diagram illustrating a sequence of the process. Here, description will be given focusing on a process in the child SMF 100*a* for convenience, but the same processing can be performed in the other child SMF 100*b* and the like.

In the child SMF 100*a*, a slice assignment request (identification information (SMF ID) of the child SMF and resource usage policy) is transmitted to the parent SMF 100 by the communication unit 105 (S201). It should be noted that a service applied from the child SMF 100*a* may be designated.

In the parent SMF 100, when the communication unit 101 receives the slice assignment request, the table control unit 102 determines whether or not there is an unassigned slice for the child SMF in the slice management table 103 (S202). It should be noted that, when a service is designated, the table control unit 102 determines whether or not there is a slice that matches the service.

When there is an unassigned slice and there is a slice that matches the resource usage policy or a slice to which resources exceeding the resource usage policy that is requested is assigned, the identification information of the child SMF 100*a* making the request is stored in the slice management table 103 in association with the slice (S203).

The slice usage situation information is transmitted to the child SMF 100*a* (S204). It should be noted that when it is determined in S203 that there is no slice that satisfies the resource usage policy, an error is notified of.

In the child SMF 100*a*, the received slice usage situation information is stored in the slice management table 106 (S205).

Figure 14:
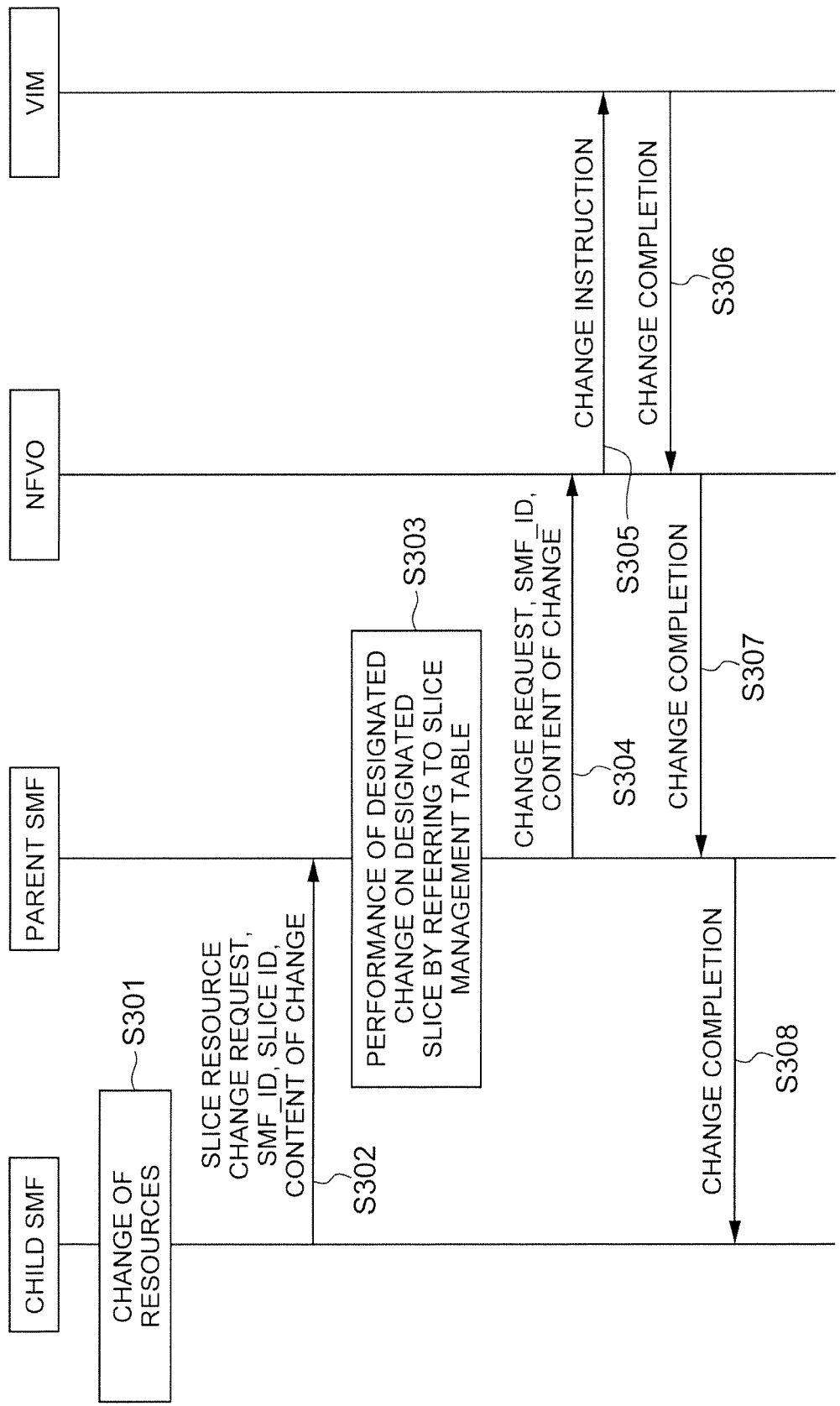
FIG. 14 is a sequence diagram of a process when change of resources is requested.

Next, a process when change of resources is requested in the child SMF 100*a* will be described. FIG. 14 is a diagram illustrating a sequence of the process. It should be noted that a change request in the child SMF 100*a* will be described by way of example herein.

In the child SMF 100*a*, an operator who refers to the slice management table 106 performs a manipulation for changing the resources, and an input of the content of the change is performed through a manipulation unit (not illustrated) (S301). A slice resource change request is transmitted from the child SMF 100*a* to the parent SMF 100 (S302). Here, the identification information (SMF JD) of the child SMF 100*a*, the slice ID that is a change target, and the content of change (the number of increase CPUs, increased memory capacity, or the like) are included in the slice resource change request.

In the parent SMF 100, when the change request is received, the table control unit 102 refers to the slice management table 103, and the assigned resources of the slice management table 103 are changed for the slice designated by the slice ID (S303).

In the parent SMF 100, the communication unit 101 transmits the change request to the NFVO 30 (S304). This change request includes the slice ID of the slice that is a change target, and the content of the change.

In the NFVO 30, the change request is received by the resource change reception unit 32, a resource change instruction is transmitted to the VIM 50 (S305), and a changing process is performed in the VIM 50. Thereafter, the VIM 50, the NFVO 30, and the parent SMF 100 are notified of change completion (S306 to S308). When the change is not received in the NFVO 30, NG is notified of. In that case, the slice management table 103 and the slice management table 106 in the parent SMF 100, the child SMF 100a, and the like return to those before the change.

Here, a state transition of the content stored in the slice management table 103 and the slice management table 106 are shown with the assigned resource changing process with reference to FIG. 15.

FIG. 15(b) illustrates the slice usage situation information stored in the slice management table 106 of the child SMF 100a (ID: child SMF 1). Here, it is shown that a CPU among the server resources (ID: server 1) constituting the slice is increased by one from one core to two cores. This is content processed in S301.

FIG. 15(a) illustrates the slice usage situation information stored in the slice management table 103 of the parent SMF 100. A CPU of the server resources of the server (ID: server 1) constituting the slice managed by the child SMF 100a is increased from one core to two cores according to the change request from the child SMF 100a.

Although not illustrated, the content of the change is similarly reflected in the NFVO 30. An assigned resource column in the slice usage situation table illustrated in FIG. 6 is changed according to a request from the parent SMF 100.

Thus, the parent SMF 100 assigns the resources to each of the slices with respect to the child SMFs 100a to 100c, such that all or some of the plurality of slices managed by the parent SMF 100 can be used independently with respect to a plurality of business operators.

As described above, although an upper business operator (the parent SMF 100) can assign slice resources to a plurality of lower business operators (the child SMFs 100a to 100c), but using this, the upper business operator can cause the slices of the lower business operator to be selected in response to an access request from one user.

FIG. 16 is a diagram illustrating a configuration of a system including the parent SSF 70 that performs slice selection. This system includes the parent SSF 70 and the child SSFs 70a to 70c. The parent SSF 70 includes a transfer unit 71 and a child SSF selection unit 72. The child SSF 70a includes a transfer unit 73 and a slice selection unit 74.

The transfer unit 71 receives the data transmitted from the UE 90 via the base station 80 and transfers the data to the child SSF selected by the child SSF selection unit 72.

The child SSF selection unit 72 selects a child SSF according to an SSF selection parameter designated in a header portion of the data.

The child SSFs 70a to 70c include a transfer unit 73 and a slice selection unit 74.

The transfer unit 73 receives the data transmitted from the parent SSF 70 and transfers the data to the slice selected by the slice selection unit 74.

The slice selection unit 74 selects a slice according to a slice selection parameter designated in a sub-header portion of the data.

FIG. 17 illustrates a data structure. As illustrated in FIG. 17, the data processed by the parent SSF 70 and the child SSFs 70a to 70c includes a header portion, a sub-header portion, and a data portion (not illustrated). The header portion includes a user ID as a transmission source, and identification information of a child SSF indicating a child SSF designated by the user.

The child SSF selection unit 72 of the parent SSF 70 selects the child SSF according to the identification information of the child SSF designated by the header portion.

The sub-header portion includes a UE usage type, a DCN type, and a service type as slice selection parameters. The UE usage type indicates whether a device is an embedded device, the DCN type indicates a slice ID, and the service type indicates a service. The slice selection unit 74 selects one slice according to these slice selection parameters.

It should be noted that it is preferable for a process such as encryption to be performed on a sub-header portion and a data portion as this data group. It is preferable for other child SSFs to be unable to see the data when business operators of the child SSFs are caused to be independent.

Next, effects of the SMF 100, the child SMF 100a, and the like of the embodiment will be described. The system 1 includes the parent SMF 100 and the child SMFs 100a to 100c. The child SMFs 100a to 100c are disposed for each management unit of a slice which is a virtualized network, and are disposed, for example, for one or each of a plurality of different communication carriers. The parent SMF 100 manages these child SMFs 100a or the like. The parent SMF 100 is, for example, a communication carrier, and the child SMF 100a or the like are, for example, MVNO operators to which the slice has been assigned by the communication carrier, or other communication carriers.

In the parent SMF 100, the slice management table 103 manages slice resources that are managed by the child SMF 100a or the like, and the communication unit 101 can notify the child SMF 100a or the like of this. Accordingly, the parent SMF 100 can assign slices to the child SMF 100a or the like.

On the other hand, the child SMF 100a or the like receives the slices and stores the slices in the slice management table 106. Accordingly, the child SMF 100a or the like can manage the resources of the slices that are managed by the child SMF 100a or the like, and the child SMF 100a can independently manage the resources.

Further, in the parent SMF 100, the communication unit 101 outputs the slice usage situation information request to the NFVO 30 which is a slice information storage device, such that the resources assigned to the slice stored in the slice usage situation table can be acquired from the NFVO 30. Accordingly, using this, it is possible to make it possible to assign the slices to the child SMF.

Further, in the SMF 100, when the communication unit 101 receives the resource change request from the child SMF 100a or the like, content of change of the resources is registered in the slice management table 103 and the NFVO 30 is instructed to change the resources. Accordingly, the parent SMF 100 makes it possible to change the resources in response to a request from the child SMF 100a or the like. Therefore, it is possible to make it possible to perform management of the resources with independence in the child SMF 100a.

Further, in the parent SMF 100, when the resource assignment request is received from a new child SMF 100a or the like, the new child SMF 100a or the like and the slice information are stored in the slice management table 103 in association with each other. Accordingly, new slice information can be assigned according to a request from the new child SMF 100a or the like.

It should be noted that the block diagram used in the description of the embodiment illustrates blocks in units of functions. These functional blocks (constituent units) are realized by any combination of hardware and/or software. Further, a means for realizing each functional block is not particularly limited. That is, each functional block may be realized by one physically and/or logically coupled device or may be realized by a plurality of devices in which two or more physically and/or logically separated devices are connected directly and/or indirectly (for example, by a cable and/or wirelessly).

Figure 18:
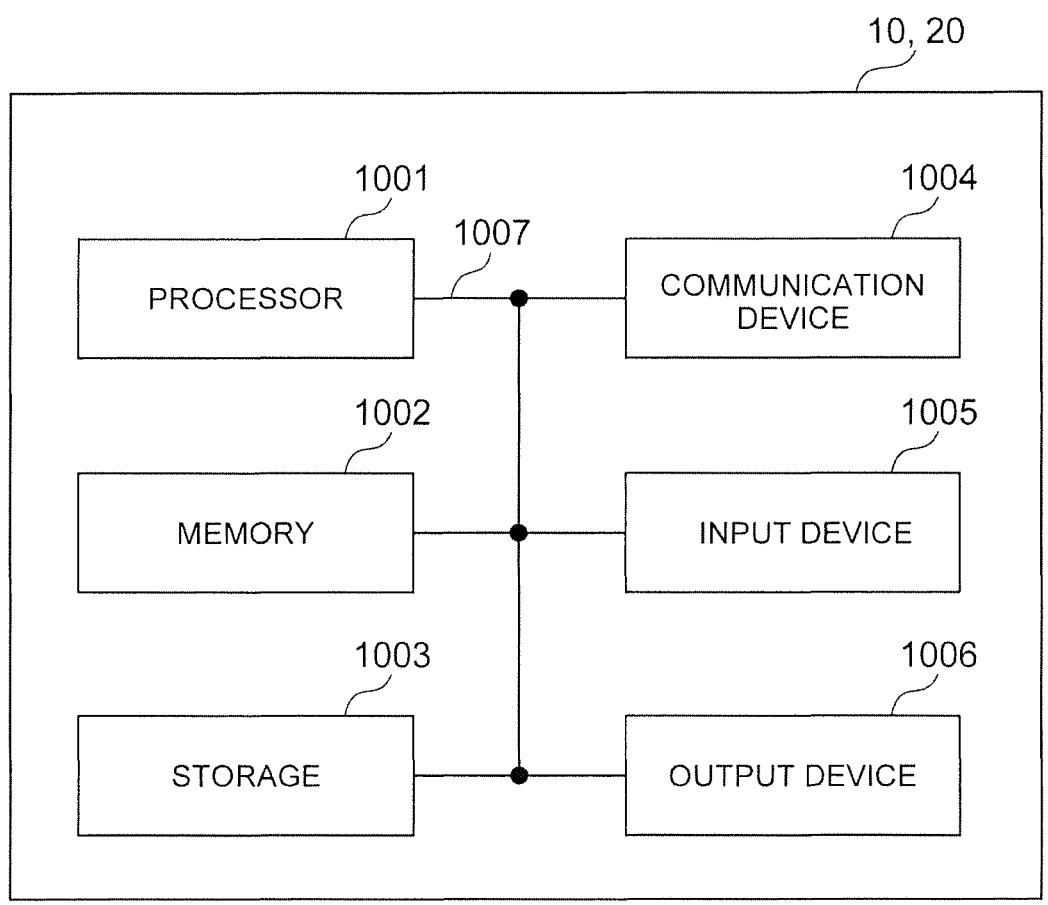

For example, the parent SMF 100, the child SMFs 100a to 100c, the NFVO 30, and the like in one embodiment of the present invention may function as a computer. FIG. 18 is a diagram illustrating an example of a hardware configuration of the parent SMF 100, the child SMF 100a, and the like according to the embodiment. The parent SMF 100 and the child SMFs 100a to 100c described above may be physically configured as a computer device including a processor 1001, a memory 1002, a storage 1003, a communication device 1004, an input device 1005, an output device 1006, a bus 1007, and the like.

It should be noted that, in the following description, the term "device" can be interpreted as a circuit, a device, a unit, or the like. The hardware configuration of the parent SMF 100 and the child SMF 100a may be configured to include one or a plurality of devices illustrated in FIG. 18 or may be configured not to include some of the devices.

Each function in the parent SMF 100 and the child SMF 100a is realized by loading predetermined software (programs) into hardware such as the processor 1001 or the memory 1002, so that the processor 1001 performs computation to control communication using the communication device 1004, and reading and/or writing of data in the memory 1002 and the storage 1003.

The processor 1001, for example, operates an operating system to control the entire computer. The processor 1001 may be configured of a central processing unit (CPU) including an interface with a peripheral device, a control device, a computing device, a register, and the like. For example, the table control unit 102 may be realized by the processor 1001.

Further, the processor 1001 reads a program (program code), a software module, or data from the storage 1003 and/or the communication device 1004 to the memory 1002, and executes various processes according to the program, the software module, or the data. As the program, a program for causing the computer to execute at least part of the operation described in the above embodiment may be used. For example, the table control unit 102 may be realized by a control program stored in the memory 1002 and operating on the processor 1001 or other functional blocks may be realized similarly. Although the case in which the various processes described above are executed by one processor 1001 has been described, the processes may be executed simultaneously or sequentially by two or more processors 1001. The processor 1001 may be implemented by one or more chips. It should be noted that the program may be transmitted from the network via an electric communication line.

The memory 1002 is a computer-readable recording medium, and may be configured of, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (a main storage device), or the like. The memory 1002 can store an executable program (program code), software modules, and the like in order to implement a wireless communication method according to the embodiment of the present invention.

The storage 1003 is a computer-readable recording medium, and may be configured of, for example, at least one of an optical disc such as a compact disc ROM (CD-ROM), a hard disk drive, a flexible disk, a magneto-optical disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above may be, for example, a database including the memory 1002 and/or the storage 1003, a server, or another appropriate medium.

The communication device 1004 is hardware (a transmission and reception device) for performing communication between computers via a wired and/or wireless network, and is also referred to as a network device, a network controller, a network card, a communication module, for example. For example, the communication unit 101 described above may be realized by the communication device 1004.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs output to the outside. It should be noted that the input device 1005 and the output device 1006 may be an integrated configuration (for example, a touch panel).

Further, respective devices such as the processor 1001 and the memory 1002 are connected by a bus 1007 for information communication. The bus 1007 may be constituted by a single bus or may be constituted by buses different between the devices.

Further, the parent SMF 100 and the child SMFs 100a to 100c may be configured to include hardware such as a microprocessor, a digital signal processor (DSP), an application specific integrated circuit (ASIC), a programmable logic device (PLD), or a field programmable gate array (FPGA), and part or all of each functional block may be realized by hardware. For example, the processor 1001 may be realized using at least one piece of hardware.

Although the present invention is described in detail in the foregoing, it is apparent to those skilled in the art that the present invention is not restricted to the embodiment described in the present specification. The present invention can be implemented as a modified and changed form without deviating from the spirit and scope of the present invention defined by the appended claims. Accordingly, the description of the present specification is given merely by way of illustration and does not have any restrictive meaning to the present invention.

Note that notification of information may be made by another method, not limited to the aspect/embodiment described in the present specification. For example, notification of information may be made by physical layer signaling (e.g., DCI (Downlink Control Information), UCI (Uplink Control Information)), upper layer signaling (e.g., RRC (Radio Resource Control) signaling, MAC (Medium Access Control) signaling, annunciation information (MIB (Master Information Block), SIB (System Information Block))), another signal, or a combination of them. Further, RRC signaling may be called an RRC message, and it may be an RRC Connection Setup message, an RRC Connection Reconfiguration message or the like, for example.

Further, each aspect/embodiment described in the present specification may be applied to LTE (Long Term Evolution), LTE-A (LIE Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra Wide Band), Bluetooth (registered trademark), a system using another appropriate system and/or a next generation system extended based on these systems.

The procedure, the sequence, the flowchart and the like in each aspect/embodiment described in the present specification may be in a different order unless inconsistency arises. For example, for the method described in the present specification, elements of various steps are described in an exemplified order, and it is not limited to the specific order described above.

A specific operation that is performed in a specific device in the present specification is performed in an upper node in some cases.

Information or the like can be output from an upper layer (or lower layer) to a lower layer (or upper layer). It may be input and output through a plurality of network nodes.

Input/output information or the like may be stored in a specific location (e.g., memory) or managed in a management table. Further, input/output information or the like can be overwritten or updated, or additional data can be written. Output information or the like may be deleted. Input information or the like may be transmitted to another device.

The determination may be made by a value represented by one bit (0 or 1), by a truth-value (Boolean: true or false), or by numerical comparison (e.g., comparison with a specified value).

Each aspect/embodiment described in the present specification may be used alone, may be used in combination, or may be used by being switched according to the execution. Further, a notification of specified information (e.g., a notification of "being X") is not limited to be made explicitly, and it may be made implicitly (e.g., a notification of the specified information is not made).

Software may be called any of software, firmware, middleware, microcode, hardware description language or another name, and it should be interpreted widely so as to mean an instruction, an instruction set, a code, a code segment, a program code, a program, a sub-program, a software module, an application, a software application, a software package, a routine, a sub-routine, an object, an executable file, a thread of execution, a procedure, a function and the like.

Further, software, instructions, and the like may be transmitted and received via a transmission medium. For example, when the software is transmitted from a website, a server, or another remote source using wired technology such as a coaxial cable, a fiber optic cable, a twisted pair, or a digital subscriber line (DSL) and/or wireless technology such as infrared rays, no wires, or microwaves, these wired and/or wireless technologies are included within a definition of the transmission medium.

The information, signals and the like described in the present specification may be represented by any of various different technologies. For example, data, an instruction, a command, information, a signal, a bit, a symbol, a chip and the like that can be referred to in the above description may be represented by a voltage, a current, an electromagnetic wave, a magnetic field or a magnetic particle, an optical field or a photon, or an arbitrary combination of them.

Note that the term described in the present specification and/or the term needed to understand the present specification may be replaced by a term having the same or similar meaning.

The terms "system" and "network" used in the present specification are used to be compatible with each other.

Further, information, parameters and the like described in the present specification may be represented by an absolute value, a relative value to a specified value, or corresponding different information. For example, radio resources may be indicated by an index.

The names used for the above-described parameters are not definitive in any way. Further, mathematical expressions and the like using those parameters are different from those explicitly disclosed in the present specification in some cases. Because various channels (e.g., PUCCH, PDCCH etc.) and information elements (e.g., TPC etc.) can be identified by every appropriate names, various names assigned to such various channels and information elements are not definitive in any way.

Note that the term "determining" used in the present specification may include a variety of operations. For example, "determining" can include regarding the act of calculating, computing, processing, deriving, investigating, looking up (e.g., looking up in a table, a database or another data structure), ascertaining or the like as being "determined". Further, "determining" can include regarding the act of receiving (e.g., receiving information), transmitting (e.g., transmitting information), input, output, accessing (e.g., accessing data in a memory) or the like as being "determined". Further, "determining" can include regarding the act of resolving, selecting, choosing, establishing, comparing or the like as being "determined". In other words, "determining" can include regarding a certain operation as being "determined".

Further, the description "based on" used in the present specification does not mean "based only on" unless otherwise noted. In other words, the description "based on" means both of "based only on" and "based at least on".

Furthermore, "means" in the configuration of each device described above may be replaced by "unit", "circuit", "device" or the like.

"As long as "including", "comprising" and transformation of them are used in the present specification or claims, those terms are intended to be comprehensive like the term "comprising". Further, the term "or" used in the present specification or claims is intended not to be exclusive OR.

In the present specification, it is assumed that a plurality of devices are also included in cases other than a case in which there is obviously only one device in the context or technically.

In the present disclosure, reference to an element includes both one and a plurality of such elements unless it is clearly stated that it is singular.

REFERENCE SIGNS LIST

11 Service request reception unit
12 Information reception unit
13 Assignment determination unit
14 Resource change determination unit
15 Resource change request unit
16 Assignment request unit
17 Notification unit
31 Information transmission unit
32 Resource change reception unit
33 Service assignment request reception unit 34 Holding unit
35 Resource request unit
36 Function addition request unit
37 Service assignment unit
38 Slice usage situation information request reception unit
41 Function addition request reception unit
42 Holding unit
43 Function addition unit
51 Resource request reception unit
52 Holding unit
53 Resource securing unit
54 Monitoring unit
71 Transfer unit
72 Child SSF selection unit
73 Transfer unit
74 Slice selection unit
101 Communication unit
102 Table control unit
103 Slice management table
105 Communication unit
106 Slice management table.

The invention claimed is:

1. A slice management system comprising:
a slice information storage device; and
slice management devices,
wherein the slice information storage device manages a virtual network constructed in physical resources of a network infrastructure and a mobile communication network of a communication service, the slice information storage device includes a holding unit that stores slice information including slice usage information,
wherein the slice management devices include a parent slice management device and a plurality of child slice management devices,
wherein the parent slice management device is configured to send a request for the slice information to the slice information storage device,
wherein the slice information storage device refers to the slice information of the holding unit, acquires the slice information from the holding unit, and transmits the slice information to the parent slice management device,
wherein the parent slice management device includes:
  a parent management table that stores the slice information indicating slices managed by the child slice management devices and resources assigned to the slices, in association with the child slice management devices;
  a notification unit that notifies the child slice management devices of the slice information stored in the parent management table; and
  a control unit that acquires the slice information from the slice information storage device that stores the slice information indicating the slices and the resources assigned to the slices before association with the child slice management devices in the parent management table, and registers the acquired slice information in the parent management table,
  wherein the acquired slice information is assigned to the child slice management devices; and
the child slice management devices include:
  child management tables in which the slice information for constructing the slices is stored, the slice information being notified of by the notification unit, the slice information including slices and resources,
wherein the child slice management devices perform management of slices that are virtual networks generated on the network infrastructure, the child slice management devices being managed for one or a plurality of business operators,
wherein the parent slice management device manages the plurality of child slice management devices, and
wherein, in the parent slice management device, when the control unit receives a resource assignment request from a new child slice management device, the control unit stores the new child slice management device and the slice information in the parent management table in association with each other.

2. The slice management system according to claim 1, wherein, in the parent slice management device, when the control unit receives a resource change request from one of the plurality of child slice management device, the control unit registers content of the change of the resources in the parent management table, and instructs the slice information storage device to perform changing according to the content of the change in accordance with a process of registering the content of the change.

3. The slice management system according to claim 2, wherein, in the parent slice management device, the notification unit transmits an indication message indicating an error to the new child slice management device when it is determined that the assignment request or the change request cannot be satisfied.

4. The slice management system according to claim 1, wherein, in the parent slice management device, the notification unit transmits an indication message indicating an error to the new child slice management device when it is determined that the assignment request or the change request cannot be satisfied.

5. A slice management method in a slice management system including a slice information storage device and slice management devices,
wherein the slice information storage device manages a virtual network constructed in physical resources of a network infrastructure and a mobile communication network of a communication service, the slice information storage device includes a holding unit that stores slice information including slice usage information,
wherein the slice management devices include a parent slice management device and a plurality of child slice management devices,
wherein, in the slice information storage device, the method includes:
  storing slice information including slice usage information in a holding unit;
  receiving a request for the slice information from the parent slice management device;
  referring to the slice information in the holding unit;
  acquiring the slice information from the holding unit; and
  transmitting the slice information to the parent slice management device,
wherein, in the parent slice management device, the method includes:
  storing the slice information indicating slices managed by the child slice management devices and resources assigned to the slices in a parent management table in association with the child slice management devices;

notifying the child slice management devices of the slice information stored in the parent management table; and acquiring the slice information from the slice information storage device that stores the slice information indicating the slices and the resources assigned to the slices before association with the child slice management devices in the parent management table, and registering the acquired slice information in the parent management table, wherein the acquired slice information is assigned to the child slice management devices; and wherein, in the child slice management devices, the method includes:

storing the notified slice information for constructing the slices in child slice management tables, the slice information including slices and resources, wherein the child slice management devices perform management of slices that are virtual networks generated on a network infrastructure, the child slice management devices being managed for one or a plurality of business operators, wherein the parent slice management device manages the plurality of child slice management devices, and wherein, in the parent slice management device, when receiving a resource assignment request from a new child slice management device, storing the new child slice management device and the slice information in the parent management table in association with each other.

* * * * *